United States Patent [19]
Queiser et al.

[11] 3,871,841
[45] Mar. 18, 1975

[54] PROCESS OF RADIOACTIVE WASTE GASES

[75] Inventors: Horst Queiser, Hochstadt; Horst Schwarz, Wiesbaden; Hans-Jurgen Schroter, Essen, all of Germany

[73] Assignees: Licentia-Patent-Verwaltungs-G.m.b.H., Frankfurt am Main; Bergwerksverband GmbH, Essen-Kray, both of, Germany

[22] Filed: Apr. 2, 1973

[21] Appl. No.: 346,890

[30] Foreign Application Priority Data
Apr. 1, 1972 Germany.......................... 2216104

[52] U.S. Cl........................................ 55/66, 55/74
[51] Int. Cl............................................ B01d 53/04
[58] Field of Search............ 55/66, 74, 387; 176/19, 176/37

[56] References Cited
UNITED STATES PATENTS
3,501,923  3/1970  Lehmen................................. 55/66
3,720,043  3/1973  Kovach................................. 55/74

Primary Examiner—Charles N. Hart
Attorney, Agent, or Firm—Spencer & Kaye

[57] ABSTRACT

The radiation level of waste gases from nuclear power plants containing both activation and fission gases is controlled at or below limits permitted by applicable standards by passing such gases, prior to release to the atmosphere, through an adsorptive delay path including a body of activated carbon having the relation to the throughput and character of such gases determined by the formula $$t_c = (K \cdot E / v)$$

where $t_c$ = dwell period in minutes
$E$ = quantity of activated carbon in gases
$v$ = gas throughput in cm$^3$/minute
$K$ = dynamic adsorption coefficient of the gas in cm$^3$/g

9 Claims, No Drawings

PROCESS OF RADIOACTIVE WASTE GASES

BACKGROUND OF THE INVENTION

This invention relates to the treatment of radioactive gases to control the radiation level thereof to satisfy the standards established for safe disposal into the atmosphere.

During the operation of a nuclear reactor, stable and radioactive gaseous substances are produced. In nuclear power systems with direct circulation, such as boiling water reactors, these substances leave the reactor with the steam and reach the turbine system (turbine, preheater, condenser) where they are sucked out of the condenser, together with the air which has entered through poor seals and connections and other unavoidable minor leaks in the waste gas system which produces and maintains the vacuum in the condenser. Thus these gases are continuously being removed from the primary circuit via the waste gas system. During the operation of a water cooled and moderated reactor for which the present invention is particularly suited, substantially three types of gases are produced in the reactor system: (a) nonradioactive gases from the coolant, such as $H_2$ and $O_2$, (b) radioactive gases from the coolant, primarily isotopes of N, O, F, and (c) fusion gases from the fuel, isotopes of Kr, Xe.

Hydrogen and oxygen are produced by radiolysis. Radioactive gases from the coolant are formed during nuclear reactions of neutrons and protons with the oxygen of water. During the fission of the fuel elements, radioactive isotopes are produced of krypton and xenon. The production rate for all gases is dependent on the output of the reactor.

The gases formed by the activation, i.e., the isotopes of N, O, F, hereinafter called the activation gases, as well as the radiolytically formed hydrogen and oxygen, are continuously removed from the nuclear system in the form of steam. In the ideal case (absolutely tightly sealed fuel shells) the fission gases remain in the fuel elements. In practice, however, such perfection is not feasible so that a small portion of the fission gases therein leaks out into the reactor water through this shell and is also removed with the steam. This means that, during normal operation, some radioactive fission gases are present without there being any real defects in the shells. Of course, should a substantial leakage occur in one or more of the fuel elements, other and more extensive measures must be employed to contain and remove the radioactive materials.

These radioactive fission and activation gases ultimately mix in the condenser and must be treated before their release to the atmosphere. The purpose of this treatment is to prevent there occurring an unacceptably high contamination of the environmental air around the nuclear reactors, with the unacceptable radiation load associated with such contamination.

A waste gas treatment system is described in Kerntechnik (Nuclear Art), Volume 13, 1971, Issue 5, pages 205–213, particularly FIG. 1. That system involves the following operations: the hydrogen and oxygen produced in the radiolysis are catalytically burned with the aid of a paladium catalyst. Thereafter, waste or exhaust gases containing the radioactive gases is conducted into a delay circuit to permit decay of the radioactive constituents to satisfactory levels. Such a circuit involves, first, a mechanical delay path, usually a long pipeline, e.g. 60 meters, so that short-lived active substances, primarily nitrogen and oxygen isotopes, can decay. This mechanical delaying has been believed necessary in existing treatment plants, because nitrogen and oxygen can only be delayed adsorptively to a limited extent.

Downstream of the mechanical delay section a mechanical filter is provided to collect the solid daughter products arising during the decay of the active gases in the mechanical delay section. Such filter may be a body of sand or like inexpensive solid material. From the filter the gases are passed through a purely adsorptive delay section, where the longer-lived radioactive substances are caught on the surface of the adsorbent by free surface forces and consequently delayed. These consist essentially of the fission gases xenon and krypton. Since moisture interferes with this absorptive drying, a gas drying means usually is placed in the system between the filter means and the adsorptive delay section.

The system includes a second filter to remove from the treated gas stream any longer-lived solid particles which are still active. Conventional high efficiency filters for aerosols and fine particulate matter which are commonly used in ventilating systems for nuclear plants and the like are exemplified by those manufactured by the firm Delbag in Berlin, Germany. A nuclear waste-gas treatment system of this type is described in the article, "Reactorabgas und Gebaudeabluftbehandlung im Kernkraftwerk mit Siedewasserreactor (Reactor Exhaust Gas and Building Exhaust Air Treatment in the Nuclear Power Plant with Boiling Water Reactor)," published in the August, 1970 issue of *Atom und Strom* (Atom and Current), Volume 16, No. 8, pages 115 to 118.

Such systems have the disadvantage of requiring substantial equipment in order to provide satisfactory exhaust gas cleaning. This is especially true in respect of the mechanical delay section, which is formed by a long pipeline circuit. Since condensate inevitably forms in the pipeline section, a complex dewatering system is required. If the system is operated at pressures below atmospheric, the problems of condensate removal become greater.

Furthermore, since the flow distribution through this section is more or less parabolic, the flow velocity is thus higher in the center of the pipe than at the wall. This means that the retention time for material to be delayed is not uniform and the designing of the delay section has to be carried out on the basis of the higher flow velocity at the center of the pipes.

The large volumes associated with this prior system require expensive radiation shielding, both for the pipeline circuit and for the space where the removed condensate is collected.

SUMMARY OF THE INVENTION

An object of the present invention, therefore, is to provide an improved exhaust gas cleaning system of simplified design and operation as compared to prior systems.

Another object of the invention is to reduce the expense of design and operation with effective treatment of radioactive oxygen and nitrogen.

A further object is to provide sufficient retention time for radioactive gases without a separate mechanical delay section and, concomitantly, to substantially reduce radiation shielding expenses.

These and other objects will become apparent in the discussion that follows.

DETAILED DESCRIPTION OF THE INVENTION

Noble gases, such as argon, kryton and xenon, for example, flow substantially slower through a delay path filled with an adsorption agent, preferablly activated carbon, than does the inert carrier air. The flow speed for the latter is the speed corresponding to the purely mechanical flow rate corresponding to the volume of holes in the fill. It has been thought that the carrier air occupies all adsorption spots due to its high concentration (greater than 99 percent by volume) so that the activation gases which are present as traces, i.e., the active nitrogen and oxygen isotopes, are not adsorbed and thus flow past the activated carbon grains. The dwell periods in the hole volume, consequently, would be insufficient to reduce the concentration of the nitrogen and oxygen isotopes to below the maximum permissible values. It was thus considered to be necessary to provide large-volume pipelines ahead of the activated carbon atoms as explained above wherein the radioactive oxygen and nitrogen become inert.

It has now been surprisingly found that the nitrogen and oxygen isotopes are adsorbed sufficiently on the activated carbon, in spite of the presence of the carrier air, so as to delay their flow through an activated carbon fill so that their periods of dwell in the fill are actually and substantially longer than the periods calculated from an assumed purely mechanical flow through the hole volume.

The present invention thus relates to a method for processing the waste gases of radioactive activation gases, such as radioactive nitrogen and oxygen isotopes, particularly for light water nuclear reactors wherein the activation gases are passed directly to an adsorptive delay path whose adsorbing volume is determined according to the required delay period and the gas throughput, without a separate prior mechanical delay period.

Thus the solution provided by the present invention consists in utilizing the adsorptive effect of activated carbon is utilized to delay the radioactive nitrogen and oxygen isotopes for the desired delay period. More particularly the present invention involves the retention by adsorption in the activated carbon columns serving in a known manner to delay the noble gases, of the radioactive nitrogen and oxygen isotopes for a sufficient period that their radioactivity will decay as in the usual mechanical delay step. This makes it possible to eliminate the large-volume mechanical delay units. While in the present invention there is some purely mechanical delay in the flow of these gases due to the volume of the holes in the activated carbon fill the effect of the adsorption strongly predominates that such mechanical delay in the flow can be neglected as a practical matter.

The amount of activated carbon required to secure the desired dwell time for the activation gases is calculated according to the following formula:

$$t_v = (K \cdot L/v)$$

Where $t_v$ = dwell period in minutes
$E$ = quantity of activated carbon in grams
$v$ = volume of gas throughput in cubic meters per minute (flowrate) and
$K$ = dynamic adsorption coefficient in cubic meters per gram Note:
for oxygen, $K = 8.9$ cm$^3$/g
for nitrogen, $K = 9.4$ cm$^3$/g For nitrogen and oxygen isotopes, the required period of dwell is at least 2 hours. The flowrate is usually 30 m$^3$/h. Then, the weight of the carbon E and from the fill weight factor, 0.5 tons per cubic meter, the absorber volume $V_1$ can be readily calculated; $E=6.75$ tons and $V_1 = 13.5$ m$^3$.

The following example demonstrates the advantages made possible by the present invention.

With a quantity of exhaust air of about 30 m$^3$ per hour conducted through empty pipelines in the conventional manner to decay the radioactive nitrogen and oxygen isotopes, a pipeline volume of 60 m$^3$ would be required.

In order to secure the equivalent volume in an activated carbon fill, which is generally about one-third of the fill volume, calculated in accordance with prior considerations, for mechanically delaying the nitrogen and oxygen isotopes und the abovementioned conditions about 90 tons of carbon; corresponding to an adsorber volume of 180 m$^3$ would be required.

While the radioactive isotopes of oxygen and nitrogen are less adsorbent than are the fission isotopes, xenon and krypton, adsorptive delay in accordance with this invention provides sufficient dwell time for both the activation gases and the fission gases to effect the desired decay of these isotopes.

It will be understood that the above description of the present invention is susceptible to various modifications, changes and adaptations, and the same are intended to be comprehended within the meaning and range of equivalents of the appended claims.

We claim:

1. Method for processing waste gases containing radioactive activation gases including radioactive isotopes of nitrogen and oxygen, which comprises passing said waste gases containing radioactive isotopes of nitrogen and oxygen through an adsorptive delay path wherein the adsorber volume is sufficient to adsorptively delay said radioactive isotopes of nitrogen and oxygen therein to permit substantial decay of said radioactive isotopes of nitrogen and oxygen, such substantial delay occuring without prior or subsequent mechanical delays of said radioactive isotopes of nitrogen and oxygen.

2. A method as defined in claim 1 wherein the waste gases are derived from a light water nuclear reactor.

3. A method as defined in claim 1 in which the waste gases contain fission gases such as krypton and xenon isotopes in addition to the activation gases.

4. A method as defined in claim 1 wherein the adsorption medium in the delay path is activated carbon.

5. A method as defined in claim 4 wherein the quantity of activated carbon is calculated according to the formula: $t_v = K \cdot E/v$, in which $t_v$ is the period of dwell in minutes, $E$ is the quantity of activated carbon in grams, $v$ is the gas throughput in cm$^3$ per minute and $K$ is the dynamic adsorption coefficient in cm$^3$ per gram.

6. A method for reducing the radioactive level of waste gases containing radioactive isotopes of oxygen and nitrogen which comprises passing said waste gases through an adsorptive delay zone in contact with an adsorbent on which said radioactive isotopes of oxygen and nitrogen are at least slightly adsorbed, the volume of said adsorbent being sufficient to retain said radioactive isotopes of oxygen and nitrogen in said adsorptive delay zone until the radioactivity level of said waste gases has decayed to a predetermed level, such decay occuring without prior or subsequent mechanical delays of said radioactive isotopes of oxygen and nitrogen.

7. A method as defined in claim 6 wherein the adsorbent is activated carbon.

8. A method as defined in claim 7 wherein the waste gases contain radioactive xenon and krypton and these gases are also retained by this adsorbent.

9. A method as defined in claim 8, wherein the volume of the adsorbent is calculated according to the formula:

$$t_v = K \cdot E/v$$

wherein $t_v$ is the dwell period in minutes;
$E$ is the quantity of activated carbon in grams;
$v$ is the gas throughput in $cm^3$ per minute; and
$K$ is the dynamic coefficient for oxygen or nitrogen in $cm^3$ per gram.

* * * * *